United States Patent
Susheel et al.

(10) Patent No.: US 7,407,085 B2
(45) Date of Patent: Aug. 5, 2008

(54) APPARATUS AND METHOD FOR ATTACHING A SEMICONDUCTOR DIE TO A HEAT SPREADER

(75) Inventors: Jadhav G. Susheel, Chandler, AZ (US); Daoqiang Lu, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 160 days.

(21) Appl. No.: 10/948,595

(22) Filed: Sep. 22, 2004

(65) Prior Publication Data

US 2006/0060637 A1    Mar. 23, 2006

(51) Int. Cl.
*B23K 31/02* (2006.01)

(52) U.S. Cl. .................. 228/207; 228/212; 228/49.5

(58) Field of Classification Search ............... 228/44.3, 228/44.7, 49.5, 207, 212
See application file for complete search history.

(56) References Cited

U.S. PATENT DOCUMENTS

| | | | | |
|---|---|---|---|---|
| 5,528,462 A | * | 6/1996 | Pendse | 361/767 |
| 5,759,269 A | * | 6/1998 | Cutting et al. | 118/213 |
| 6,074,897 A | * | 6/2000 | Degani et al. | 438/115 |
| 6,085,967 A | * | 7/2000 | Grande et al. | 228/212 |
| 6,161,749 A | * | 12/2000 | Bastacky et al. | 228/49.5 |
| 6,773,958 B1 | | 8/2004 | Wang | |
| 6,794,623 B2 | | 9/2004 | Shi | |
| 7,005,320 B2 | | 2/2006 | Kwon | |
| 2003/0102016 A1 | * | 6/2003 | Bouchard | 134/32 |
| 2005/0224953 A1 | | 10/2005 | Lee | |
| 2005/0284863 A1 | | 12/2005 | Debonis | |
| 2006/0040380 A1 | * | 2/2006 | Besemer et al. | 435/287.2 |

* cited by examiner

*Primary Examiner*—Kevin P Kerns
(74) *Attorney, Agent, or Firm*—Kenneth A. Nelson; Intel Corporation (57) ABSTRACT

Embodiments of an apparatus and method for attaching a semiconductor die to a heat spreader (or other thermal component) are disclosed. The apparatus includes a substantially flat surface to receive a number of die, and the die may be held in place on the surface by a flux, the flux being subsequently removed prior to bonding. The apparatus may further include a number of registration elements to hold a heat spreader in a relative position over each die. Other embodiments are described and claimed.

21 Claims, 6 Drawing Sheets

APPARATUS AND METHOD FOR ATTACHING A SEMICONDUCTOR DIE TO A HEAT SPREADER

FIELD OF THE INVENTION

The invention relates generally to the manufacture of semiconductor devices and, more particularly, to an apparatus and method for attaching a semiconductor die to a heat spreader.

BACKGROUND OF THE INVENTION

An integrated circuit (IC) device may include a semiconductor die upon which integrated circuitry has been formed, and this die may be mounted on a package substrate or other die carrier. The die may be both electrically and mechanically coupled to the package substrate. By way of example, an array of solder bumps (or other electrical leads) extending from the die may be coupled (e.g., by a reflow process) to a corresponding array of lands (or other electrical leads) on the substrate to form electrical connections between the die and substrate. In addition, an underfill material may be disposed between the die and substrate to secure the die onto the substrate, as well as to protect the electrical connections extending between the die and substrate. The use of an array of solder bumps to provide electrical connections, as described above, is often referred to as Controlled Collapse Chip Connect (or "C4").

The IC device may further include one or more thermal components coupled with the die, these thermal components functioning to transfer away or otherwise dissipate heat generated by the integrated circuitry during operation. For example, a heat spreader may be thermally coupled with the die, and a heat sink may, in turn, be thermally coupled with the heat spreader. Typically, a first thermal interface is disposed between the die and heat spreader, and a second thermal interface is disposed between the heat spreader and heat sink. The first thermal interface mechanically and thermally couples the die with the heat spreader, with the second thermal interface performing a similar role between the heat spreader and heat sink. The thermal interfaces may comprise any thermally conductive material capable of providing the requisite mechanical attachment, such as a solder material.

Prior to attaching a semiconductor die to a package substrate or die carrier, the die may first be attached to a heat spreader. One type of apparatus used for bonding a die and heat spreader includes a base plate into which two pockets have been machined. The first pocket is deeper and is sized to receive the die, whereas the second pocket is relatively shallower and is sized to receive the heat spreader. The die is typically smaller than the heat spreader, and the periphery of the first pocket lies inside the periphery of the second pocket. During bonding, a die is placed in the first pocket, and a heat spreader is placed over the die and within the second pocket. A solder thermal interface may be disposed between the die and heat spreader, and the assembly (including the bonding apparatus) can then be heated to reflow the solder thermal interface, thereby attaching the heat spreader to the die.

To ensure alignment between the die and heat spreader, as well as to inhibit movement of these components during bonding, the first and second pockets must be machined to precise dimensions, both laterally and depth wise. Further, because precise dimensions need to be maintained, each size of die requires a different fixture having a unique pocket size. Because of the requisite precise dimensions, as well as the inability to use one fixture to hold multiple die sizes, the above-described bonding apparatus and method can be very expensive to implement.

DETAILED DESCRIPTION OF THE INVENTION

Disclosed are embodiments of an apparatus and method for attaching a semiconductor die to a heat spreader (or other thermal component). According to one embodiment, an apparatus includes a base having a substantially flat surface, and a number of die placement regions are provided on this surface. Each die placement region may include a number of registration elements to restrict movement of a heat spreader, and each die placement region may also include one or more anchoring elements to secure a spring clip or other anchoring device over a heat spreader and die assembly. According to another embodiment, a flux is applied to the base and a die is placed over the flux in each die placement region. The flux inhibits movement of the die during subsequent processing. A thermal interface and heat spreader may then be placed over the die, with the registration elements holding the heat spreader relative to the die. Spring clips may then be secured to the base plate to compress the heat spreaders (and thermal interfaces) against their respective die, and the assemblies may be bonded together (e.g., by a solder reflow process). If flux is applied, the flux is removed prior to bonding. The bonding apparatus is relatively low in cost due to ease of fabrication, and this apparatus and the disclosed method are suitable to high volume manufacturing.

Figure 1A:
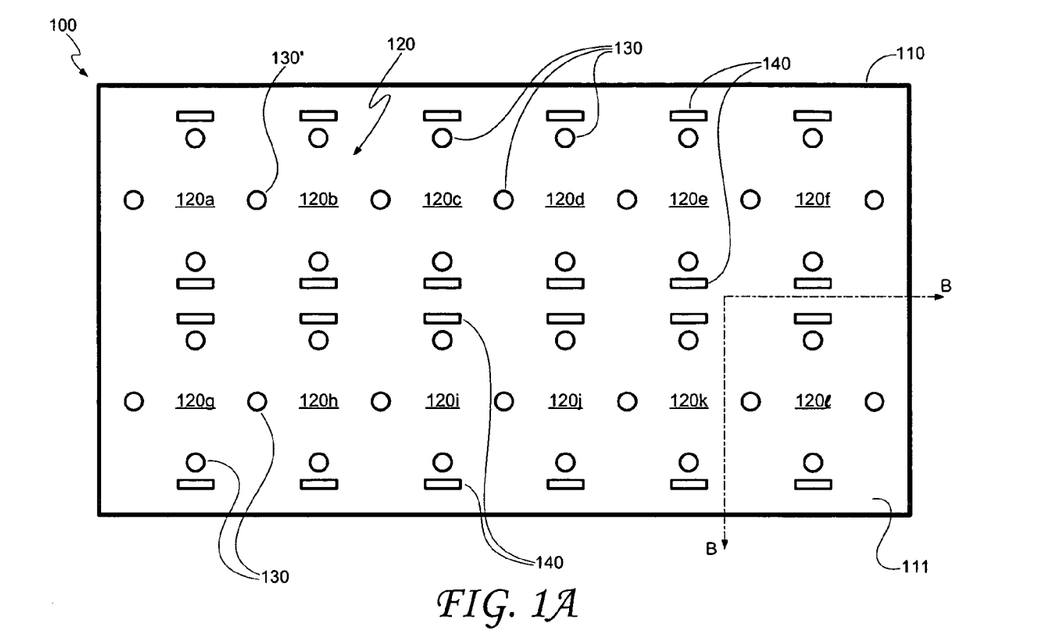
FIG. 1A is a schematic diagram illustrating a plan view of one embodiment of an apparatus for bonding a die to a heat spreader.
Figure 1B:
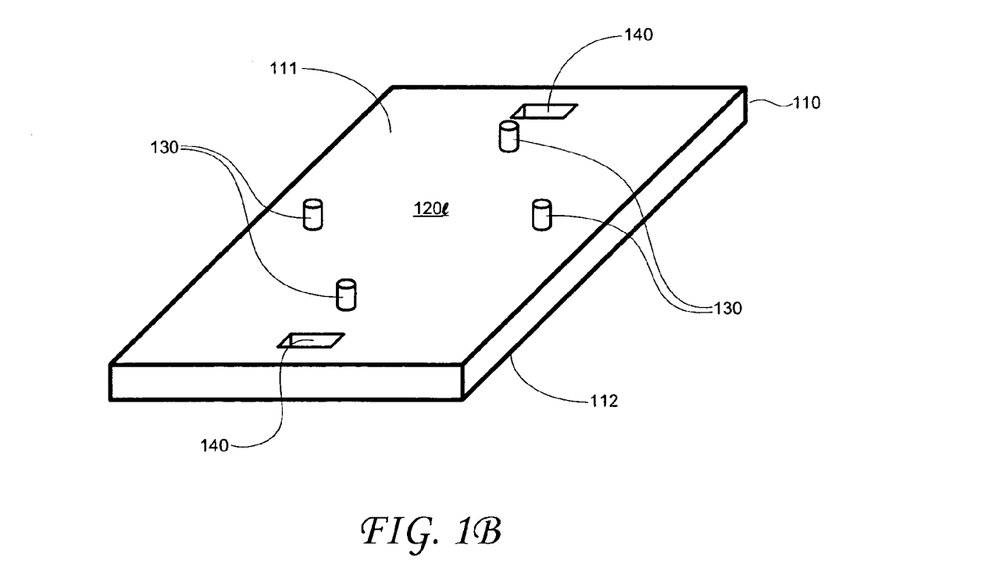
FIG. 1B is a schematic diagram illustrating a perspective view of a portion of the bonding apparatus shown in FIG. 1A.

Illustrated in FIGS. 1A and 1B is an embodiment of an apparatus 100 for bonding a die to a heat spreader. A plan view of the apparatus 100 is shown in FIG. 1A, whereas FIG. 1B shows a perspective view of a portion of the apparatus, as taken along line B-B in FIG. 1A. In addition, an embodiment of a method of bonding a die to a heat spreader, as may be performed using the apparatus 100, is described with respect to FIG. 2 and the accompanying text below.

Referring now to FIGS. 1A and 1B, the apparatus 100 comprises a base 110 having an upper surface 111 and an opposing lower surface 112. In one embodiment, the base 110 comprises a rectangular shaped plate, and in a further embodiment, the upper surface 111 is substantially flat. However, it should be understood that the base 10 may have any suitable shape and/or configuration. The base 110 may be constructed from any suitable materials, including both ferrous and non-ferrous metals, as well as plastic materials. According to one embodiment, the base 110 comprises a metal capable of withstanding temperatures in excess of 300 degrees C. (e.g., minimal warpage), such as a stainless steel.

Provided on the upper surface 111 of base 10 are a number of die placement regions 120, including die placement regions 120a, 120b, . . . , 120l. An enlarged perspective view of die placement region 120l is shown in FIG. 1B. Each of the placement regions 120a-l includes a portion of the upper surface 111 sufficient in size to receive a semiconductor die. Note that because the upper surface 111 is substantially flat (e.g., it does not include a pocket for a specific size of die), the placement regions 120 can receive various sizes of die. Apparatus 100 may include any suitable number of die placement regions 120, and these placement regions may be positioned on the base 110 in any suitable arrangement. For example, as shown in FIG. 1A, twelve die placement regions 120 arranged in a 2×6 array may be provided on the base 110. According to one embodiment, the apparatus 100 includes between four and twenty-four die placement regions 120.

Disposed in each die placement region 120 are a number of registration elements 130. The registration elements 130 of each die placement region 120 may comprise any devices or system capable of holding a heat spreader (or other thermal component, such as a heat sink) in position over a die in that placement region. For example, as shown in the figures, the registration elements 130 may comprise pins, each pin anchored to the base 110 (e.g., press-fit within a hole formed in the base) and extending upwardly from the upper surface 111. In the illustrated embodiment, each die placement region 120 includes four registration pins 130, each of the pins located and oriented to abut one of four edges of a rectangular-shaped heat spreader, as will be explained below in more detail. Although four pins 130 are provided for each die placement region 120 in FIGS. 1A-1B, it should be understood that a die placement region may include any suitable number of registration elements. Also, according to one embodiment, two adjacent die placement regions 120 may share a registration element. For example, as shown in FIG. 1A, die placement regions 120a and 120b share pin 130'.

In a further embodiment, associated with each die placement region 120 is one or more anchoring elements 140. The anchoring elements 140 comprise any feature capable of receiving and/or holding an anchoring device over a die placement region 120, wherein the anchoring device comprises any mechanism capable of holding a heat spreader against an underlying die, as well as securing the heat spreader and die assembly to the base 110 during bonding. In one embodiment, the anchoring elements comprise apertures (or other structures) capable of receiving a spring clip. For example, as shown in FIGS. 1A-1B, each die placement region 120 includes two apertures 140 that are formed in the base 110, and these apertures are positioned and oriented to receive a spring clip.

Figure 5:
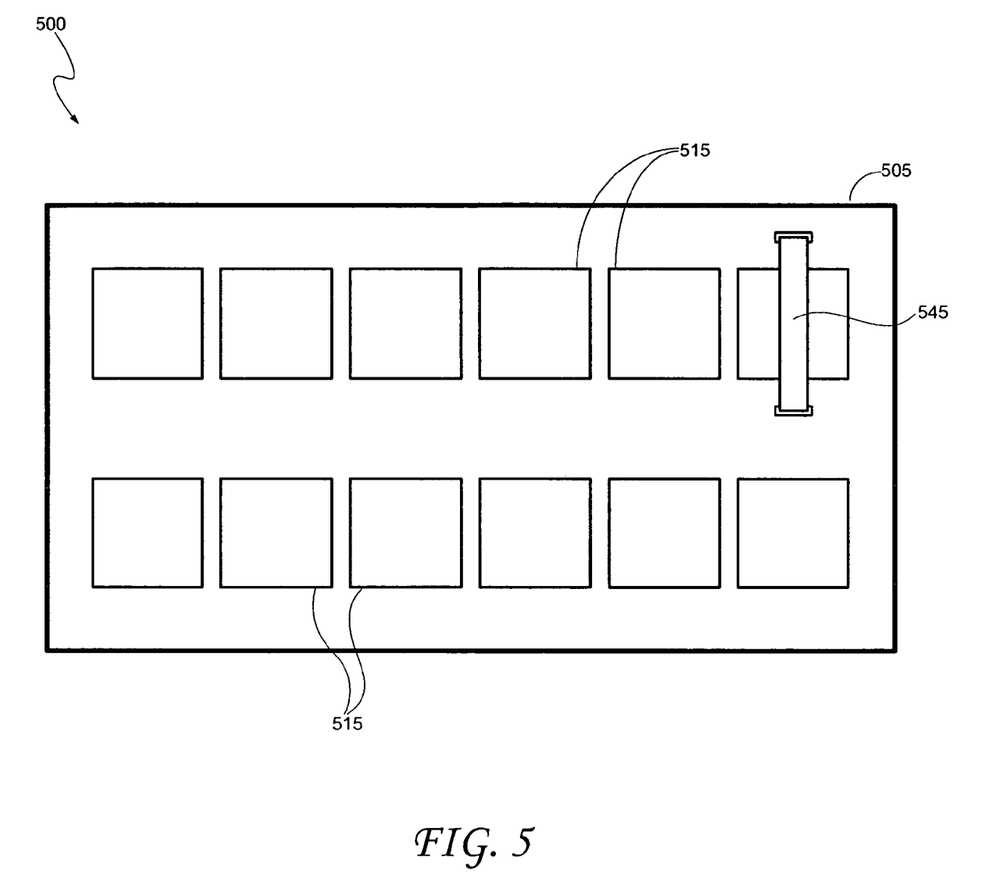
FIG. 5 is a schematic diagram illustrating a plan view of an embodiment of a cover plate, which may be used in conjunction with an embodiment of the bonding apparatus of FIGS. 1A-1B.

In a further embodiment, the bonding apparatus includes a cover 500, as shown in FIG. 5. The cover 500 comprises a rectangular shaped plate 505 including a number of apertures 515. The plate 505 may be fabricated from any suitable material, such as a ferrous metal, a non-ferrous metal, or a plastic material. The apertures 515 are arranged in a pattern corresponding to the pattern of die placement regions 120 on base 110, and each aperture 515 is sized and oriented to slide over a heat spreader (or other thermal component) that has been placed over a die in the corresponding die placement region. With the cover 500 disposed over the base 10, the apertures 515 can align a number of heat spreaders over a corresponding number of die placed on the base 110 and, further, can inhibit relative movement between each heat spreader and die. Thus, where a cover 500 is used, the registration elements 130 may not be needed on the base 110. The cover 500 may be aligned with and secured to the base 110 using any suitable combination of fasteners and/or registration features (e.g., bolts, clamps, pins, etc.). According to another embodiment, the cover 500 further includes an integral biasing element (e.g., a spring) disposed at each aperture 515 and secured to the plate 505, one of which is shown in the right-hand side of FIG. 5 (see item 545). Such biasing elements can be employed to exert a compressive force against the heat spreaders disposed within the apertures 515, and for this embodiment the anchoring elements 140 may not be needed.

Figure 2:
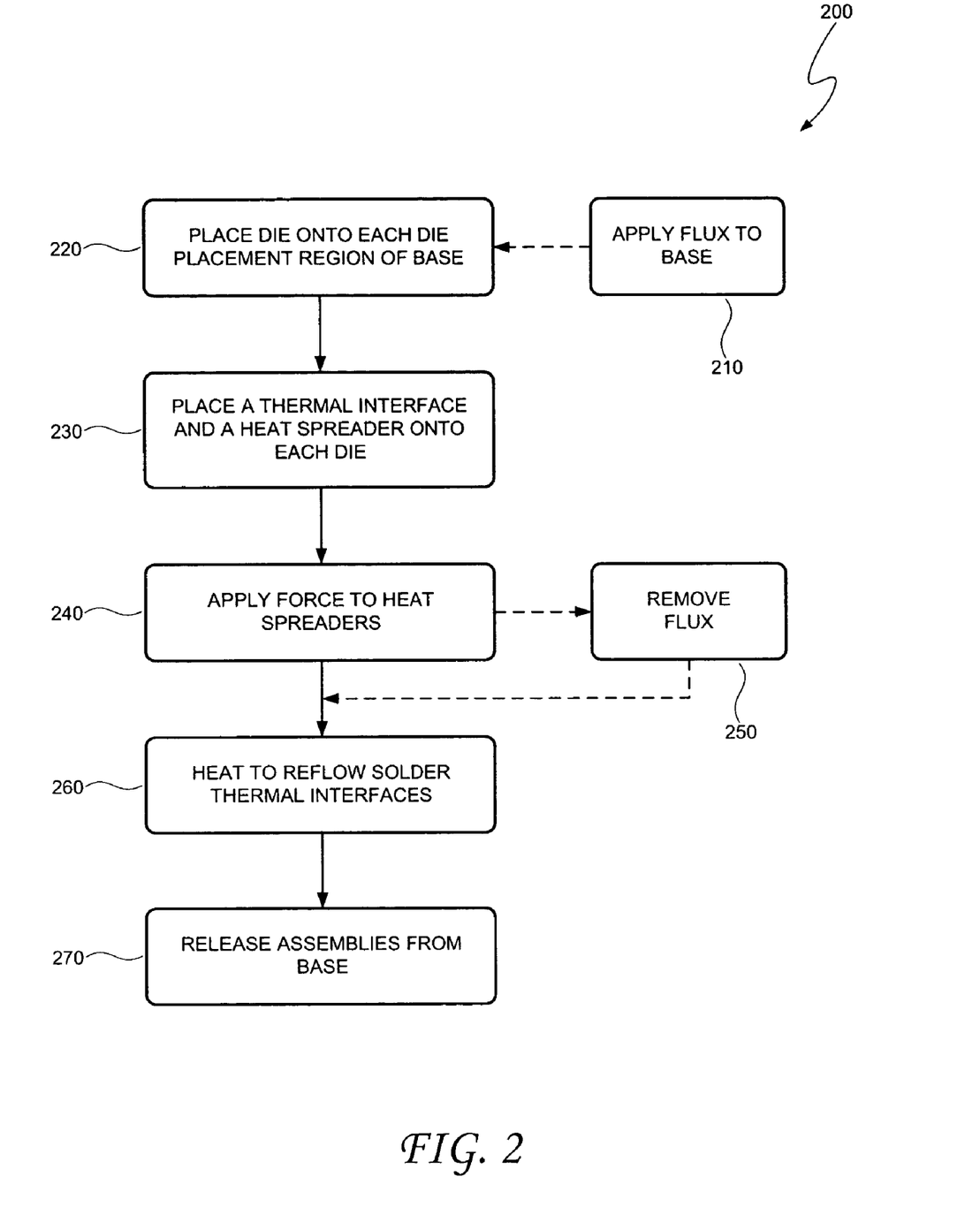
FIG. 2 is a block diagram illustrating an embodiment of a method of attaching a die to a heat spreader using the apparatus of FIGS. 1A-1B.

Turning next to FIG. 2, illustrated is an embodiment of a method 200 for attaching a die to a heat spreader (or other thermal component), which may be carried out using the apparatus 100 of FIGS. 1A-1B. Embodiments of the method 200 shown in FIG. 2 are further illustrated in the schematic diagrams of FIGS. 3A through 3F, and reference should be made to these figures as called out in the text.

Figure 3A:
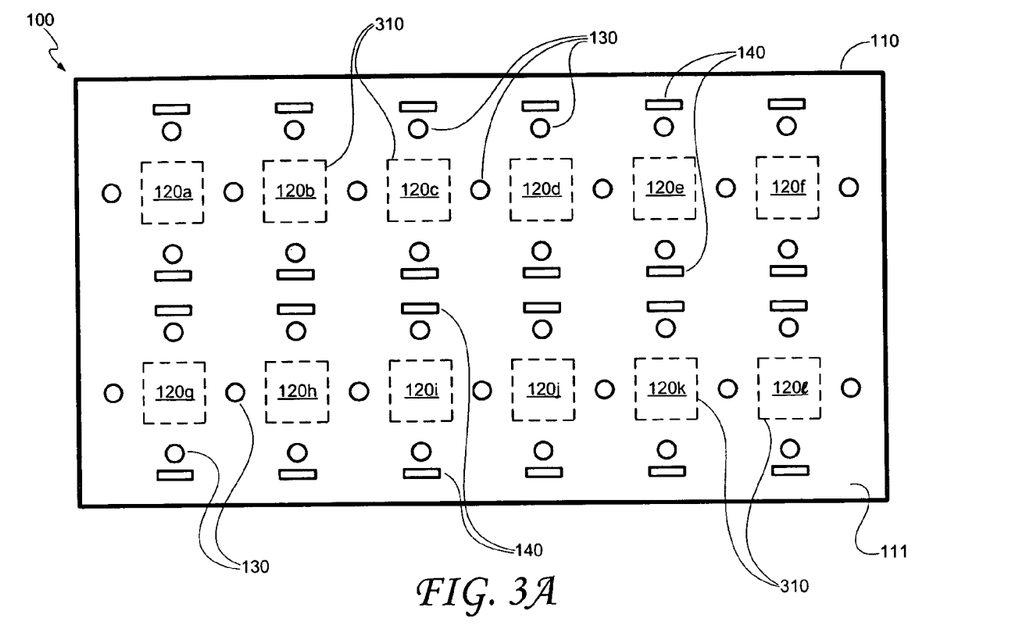
FIGS. 3A-3F are schematic diagrams illustrating embodiments of the method shown in FIG. 2.

According to one alternative embodiment, prior to placing a die in each die placement region 120, a flux or other tacky substance is applied to the upper surface of the base, as set forth in block 210. This is illustrated in FIG. 3A, where a layer of a flux 310 has been applied to the upper surface 111 of base 110 within each die placement region 120. Again, the upper surface 111 may be substantially flat, and the flux 310 may comprise any substance capable of holding a die in position on the upper surface 111 and, further, that is amenable to removal prior to a subsequent bonding process. In essence, the flux 310 can be viewed as providing a temporary bond between a die and the base 110, and this temporary bond can prevent movement of the die should movement of the base 110 be needed (e.g., movement from one processing station to the next). Use of a flux 310 can eliminate the need to form a pocket or other feature on the base 110 to According to one embodiment, the substance 310 comprises a water soluble flux, or other water soluble substance (e.g., a water soluble polymer, such as polyvinyl alcohol) that is amenable to removal using a solution including water. However, it should be understood that the disclosed embodiments are not limited to water soluble fluxes or other water soluble substances. Also, in one embodiment, as shown in FIG. 3A, flux 310 is applied as a discontinuous layer, wherein flux is applied to portions of the upper surface 111 within the die placement regions 120. However, in a further embodiment, a continuous layer of flux may be applied over the entire upper surface 111 (or a substantial portion thereof).

In another embodiment, flux is not applied to the upper surface 111 of base 110. For example, if a die and heat spreader, as well as an anchoring device such as a spring clip, are placed in each die placement region 120 while the base 110 is at one processing station, such that there is no movement of the base 110 between die placement and attachment of a spring clip, flux may not be necessary.

Figure 3B:
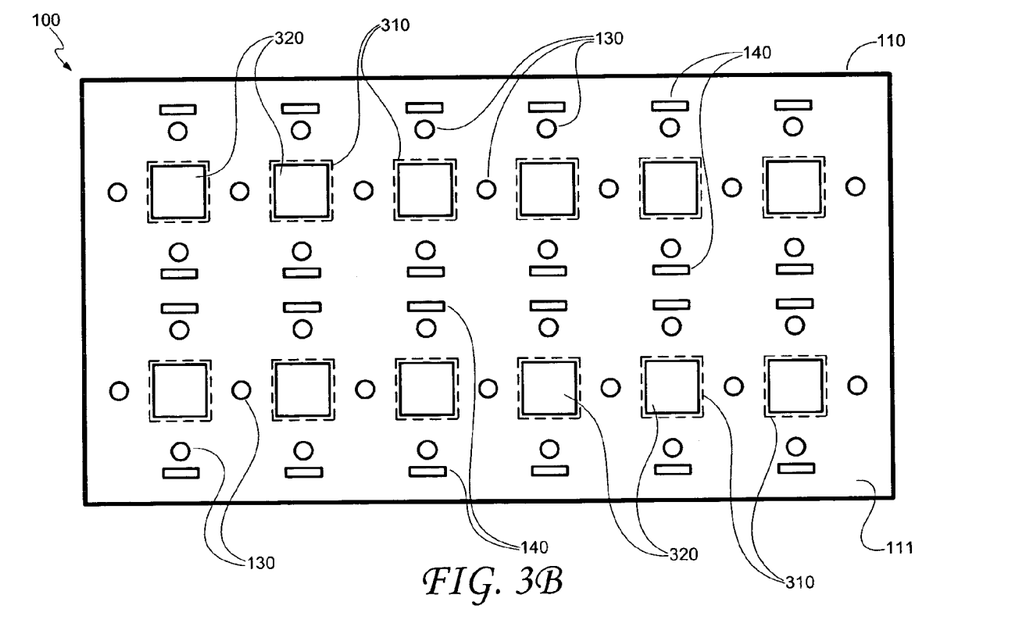

Referring next to block 220 in FIG. 2, a die is placed in each die placement region. This is illustrated in FIG. 3B, where a die 320 has been placed on the upper surface 111 within each placement region 120, each die 320 being placed on the layer of flux 310 applied to that placement region. The die 320 may be placed on the base 110 using a pick-and-place machine, or other automated equipment. Each die 320 may comprise any type of IC device, such as a microprocessor, a network processor, an application specific integrated circuit (ASIC), a field programmable gate array (FPGA), or other type of logic device, as well as a memory device. In one embodiment, each die 320 has a thickness of approximately 200 μm, or less.

Figure 3C:
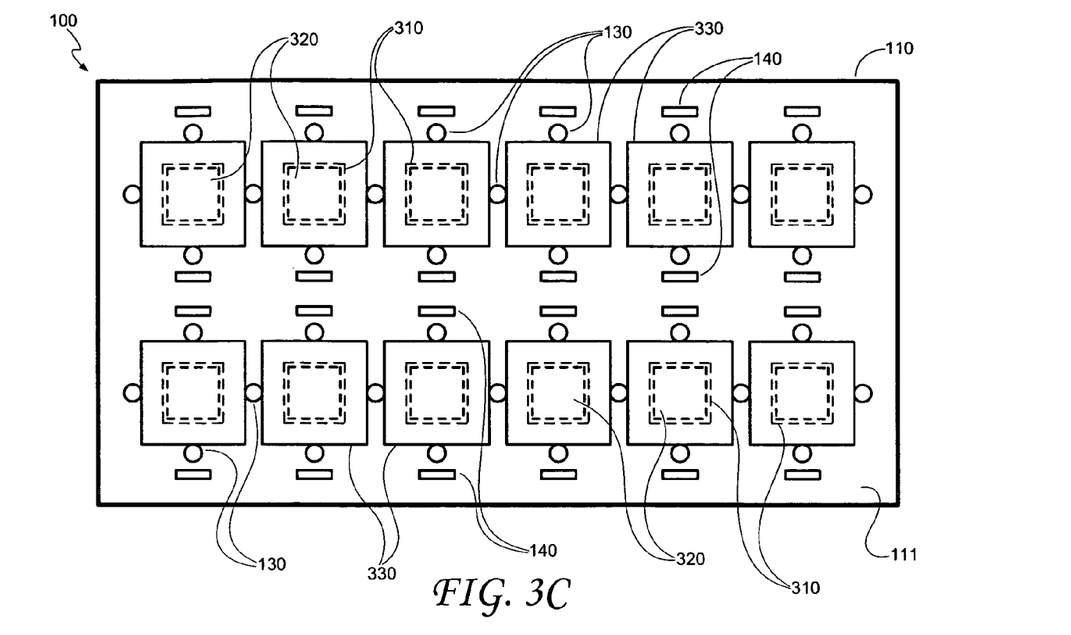

As set forth in block 230, a thermal interface and heat spreader (or other thermal component) are placed over each die. This is illustrated in FIG. 3C, where a heat spreader 330 and a thermal interface has been placed over the die 320 in each die placement region 120. Each of the heat spreader 330 and thermal interface can be placed over the die 320 using a pick-and-place machine, or other automated equipment. Although not shown in FIGS. 3C through 3E, the thermal interface can be seen in FIG. 3F (item 335), which will be described below in more detail.

The function of the thermal interface (see FIG. 3F, item 335) is to thermally couple the heat spreader 330 with the die 320 and to conduct heat from the die to the heat spreader. The thermal interface may comprise any suitable conductive material. In one embodiment, the thermal interface comprises a layer of a solder material. However, the disclosed embodiments are not limited to a solder thermal interface, and it is contemplated that other materials (e.g., thermally conductive epoxies) may also be used as the thermal interface material. According to one embodiment, the thermal interface comprises a preform sheet of solder (or other material) that is placed between a die 320 and a heat spreader 330. According to another embodiment, the thermal interface may comprise a layer of solder that has been formed on a surface of the heat spreader 330 (i.e., the surface facing the underlying die). Where the thermal interfaces comprise a solder material, a backside of each die 320 may include a layer of material (e.g., gold) to promote adhesion with the solder thermal interface.

The function of the heat spreader 330 is to conduct heat away from the die 320, as well as to spread the heat laterally and outwards toward the periphery of the heat spreader. Ultimately, the heat spreader may be thermally coupled to a heat sink (e.g., a multi-fin heat exchanger), and the heat sink can dissipate the heat to the surrounding environment. In one embodiment, each heat spreader 330 comprises a rectangular shaped plate, and when placed over a die 320 in a die placement region 120, each edge of the heat spreader abuts (or is at least in close proximity to) one of the registration pins 130, as shown in FIG. 3C. Thus, the registration pins 130 inhibit movement of each heat spreader 330 relative to its underlying die 320, as well as relative to base 110. The heat spreaders 330 may each be constructed from any suitable conductive material, such as, for example, copper and copper alloys, other thermally conductive metals, thermally conductive non-metals (e.g., diamond), as well as composite materials (e.g., an array of carbon nanotubes disposed in a matrix material).

Figure 3D:
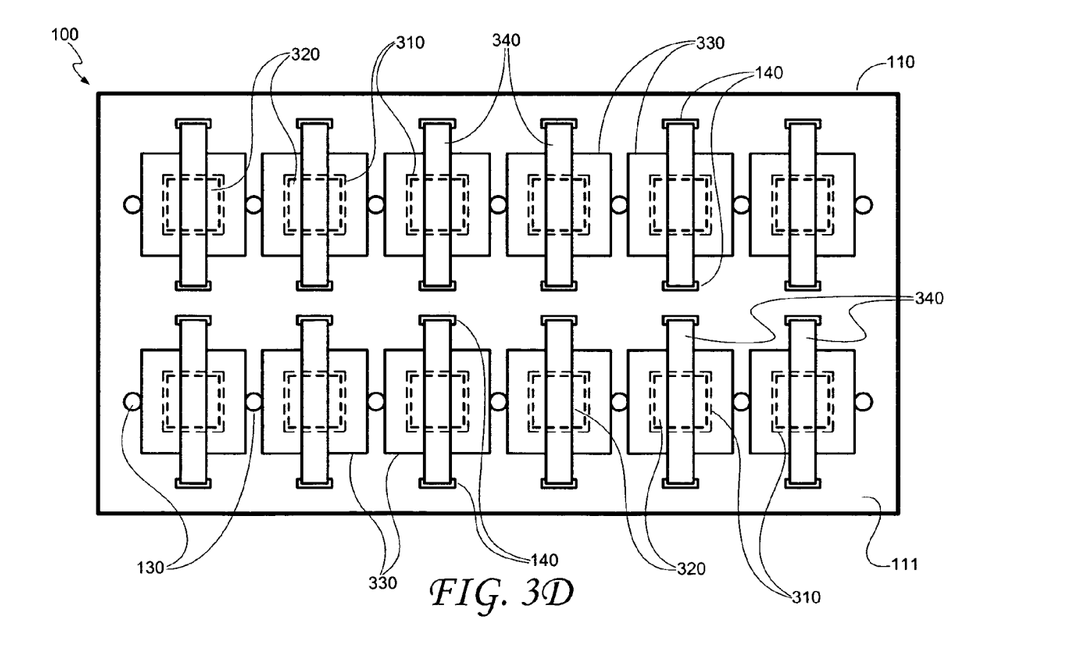

Referring to block 240 in FIG. 2, a force is applied to each heat spreader to compress the heat spreader against the underlying die (and thermal interface) during bonding. This is illustrated in FIG. 3D, where a spring clip 340 has been placed over each heat spreader 330 and attached to the base 110 at apertures 140. In addition to compressing the heat spreader 330 against the die 320, the spring clips 340 can also inhibit relative movement of the die 320 (e.g., due to friction forces generated between the die and base upper surface 111 and between the die and thermal interface material). Again, the disclosed embodiments are not limited to the use of spring clips, and any other suitable device may be employed to apply a compressive force to the die and heat spreader assemblies. Also, in a further embodiment, rather than multiple individual spring clips, a single device may be used to apply a compressive force against each heat spreader (e.g., a lid or cover having an array of springs or other biasing elements, such as the cover 500 shown in FIG. 5).

Figure 3E:
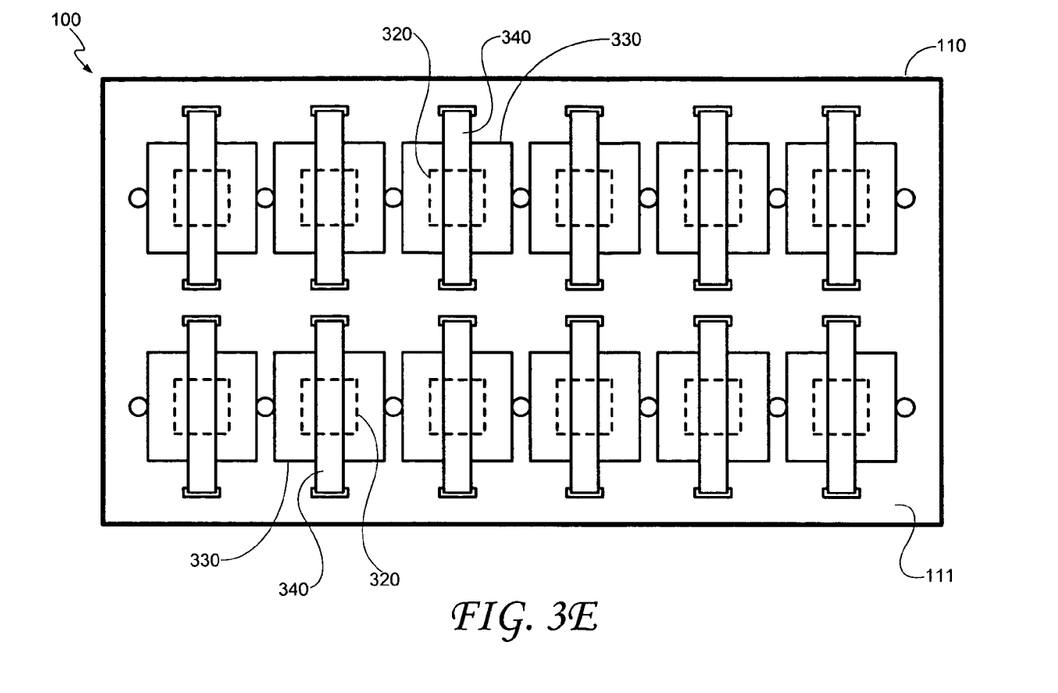
Figure 3F:
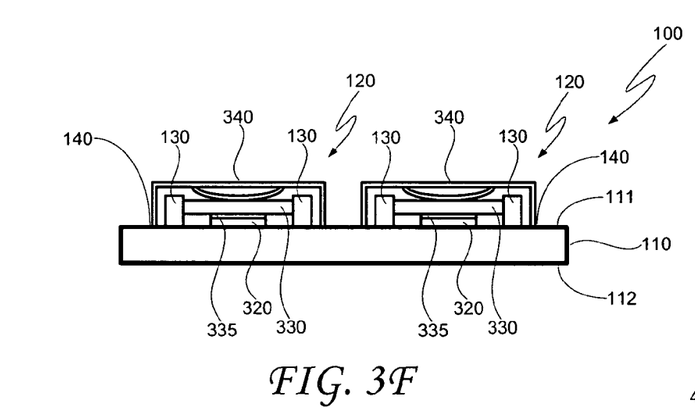

According to an alternative embodiment, where a flux (or other substance) was first applied to the base 110, the flux is removed, as set forth in block 250. This is illustrated in FIGS. 3E and 3F, where the flux 310 has now been removed. Any suitable process may be used to remove the flux. For example, where the flux comprises a water soluble substance, the flux may be removed by rinsing the apparatus 100 using a solution including water. The reader will of course appreciate that the flux removal process will vary with the type of flux used, and that other flux removal techniques may be used.

A side elevation view of the apparatus 100—with a die 320, heat spreader 330, and spring clip 340 in each die placement region 120—is shown in FIG. 3F. With reference to this figure, an assembly including a die 320, thermal interface 335, and heat spreader 340 is disposed in each die placement region 120, and a spring clip 340 is applying a compressive force against each assembly. Registration pins 130 prevent relative movement of the assemblies on the base 110 (note that some of the registration pins 130 are not shown in FIG. 3F for ease of illustration).

Referring to block 260, a heating process may be performed to reflow the solder thermal interfaces, thereby bonding each die to its corresponding heat spreader. In one embodiment, the apparatus 100 is placed in an oven, and solder reflow is performed at a peak temperature in a range of approximately 230 to 250 degrees C. In a further embodiment, the apparatus is heated to the peak temperature in multiple steps (e.g., by moving the apparatus 100 on a belt through a multi-stage oven, etc.).

Figure 4:
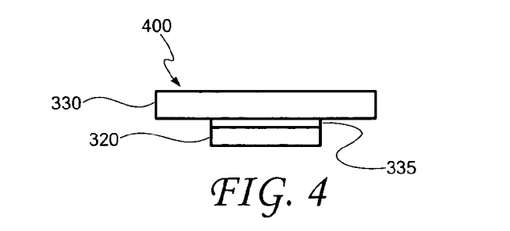
FIG. 4 is a schematic diagram illustrating an embodiment of an assembly formed according to the method of FIG. 2.

After bonding, the die and heat spreader assemblies can be released from the apparatus 100, as set forth in block 270. For example, if spring clips are utilized, the spring clips can be removed and the assemblies picked up by a pick-and-place mechanism. An example of such a die and heat spreader assembly 400 is illustrated in FIG. 4. Referring to this figure, the assembly 400 includes a die 320, a heat spreader 330, and a thermal interface 335 that both mechanically and thermally couples the heat spreader to the die. The assembly 400 may ultimately be attached to a package substrate or other die carrier, and a heat sink (e.g., a multi-fin heat exchanger) or other thermal component may be coupled with the heat spreader 330.

The foregoing detailed description and accompanying drawings are only illustrative and not restrictive. They have been provided primarily for a clear and comprehensive understanding of the disclosed embodiments and no unnecessary limitations are to be understood therefrom. Numerous additions, deletions, and modifications to the embodiments described herein, as well as alternative arrangements, may be devised by those skilled in the art without departing from the spirit of the disclosed embodiments and the scope of the appended claims.

What is claimed is:

1. A method comprising:
   providing a substantially flat surface having a plurality of registration pins integral therewith and extending away therefrom, the registration pins bounding a portion of the substantially flat surface suitable for receiving a semiconductor die, and further having a first aperture and an opposing second aperture extending into the substantially flat surface, the first and second apertures capable of receiving a spring clip;
   applying a layer of flux to the substantially flat surface;
   placing the semiconductor die on the flux, the flux to inhibit movement of the die;
   placing a thermal component over the die;
   removing the flux;
   bonding the thermal component to the die to form an assembly; and
   removing the assembly from the surface.

2. The method of claim 1, further comprising inhibiting movement of the thermal component.

3. The method of claim 1, further comprising compressing the thermal component against the die during bonding.

4. The method of claim 1, wherein the flux is water soluble and the flux is removed by rinsing with a solution including water.

5. The method of claim 1, wherein the thermal component includes a layer of solder and the thermal component is bonded to the die by reflowing the solder layer.

6. The method of claim 1, further comprising:
placing a thermal interface between the die and the thermal component, the thermal interface comprised of a solder material;
wherein the thermal component is bonded to the die by reflowing the solder thermal interface.

7. A method comprising:
providing a base having a plurality of registration pins integral therewith and extending away therefrom, the registration pins bounding a portion of the base suitable for receiving a semiconductor die, and further having a first aperture and an opposing second aperture extending into the base, the first and second apertures capable of receiving a spring clip;
applying a layer of flux to a substantially flat upper surface of the base;
placing a number of semiconductor die on the upper surface, the flux to inhibit movement of each die;
placing a number of heat spreaders on the base, each heat spreader overlying one of the die;
removing the flux;
bonding each heat spreader to the underlying die to form an assembly; and
removing each assembly from the base plate.

8. The method of claim 7, further comprising inhibiting movement of each heat spreader.

9. The method of claim 7, further comprising compressing each heat spreader against the underlying die during bonding.

10. The method of claim 9, further comprising securing a number of spring clips to the base plate, each spring clip to compress one heat spreader against the underlying die.

11. The method of claim 9, further comprising securing a cover to the base plate, the cover including a number of biasing elements, each biasing element to compress one heat spreader against the underlying die.

12. The method of claim 7, wherein the flux is water soluble and the flux is removed by rinsing with a solution including water.

13. The method of claim 7, wherein the flux layer is discontinuous and covers those portions of the base upper surface that are to receive one of the die.

14. The method of claim 7, wherein each of the heat spreaders includes a layer of solder, and each heat spreader is bonded to the underlying die by reflowing the solder layer.

15. The method of claim 7, further comprising:
placing a number of thermal interfaces on the base, each of the thermal interfaces positioned between one of the heat spreaders and the underlying die, each thermal interface comprised of a solder material;
wherein each heat spreader is bonded to the underlying die by reflowing the solder thermal interface.

16. An apparatus for bonding a number of heat spreaders with a corresponding number of semiconductor die to form a number of assemblies, comprising:
a rectangular shaped base plate having a substantially flat upper surface and an opposing lower surface; and
a number of die placement regions disposed on the upper surface of the base plate, each die placement region including
a portion of the upper surface sufficient in size to receive one of the semiconductor die,
a number of registration pins permanently attached to and extending from the upper surface, the registration pins to restrict movement of one of the heat spreaders placed over the one semiconductor die in that placement region, each of the registration pins to abut one of a number of edges of the one heat spreader, and
a first aperture and an opposing second aperture extending into the base plate, the first and second apertures capable of receiving a spring clip for compressing the one heat spreader against the one semiconductor die;
wherein each of the assemblies is removed from the base plate after a bonding process is performed.

17. The apparatus of claim 16, wherein two adjacent die placement regions share one registration pin.

18. The apparatus of claim 16, wherein the base plate comprises a metal.

19. An apparatus for bonding a number of heat spreaders with a corresponding number of semiconductor die to form a number of assemblies, comprising:
a base plate having a substantially flat upper surface and an opposing lower surface;
a number of die placement regions disposed on the upper surface of the base plate, each die placement region including a portion of the upper surface sufficient in size to receive one of the semiconductor die, a number of registration pins permanently attached to and extending from the upper surface, and a first aperture and an opposing second aperture extending into the base plate, the first and second apertures capable of receiving a spring clip; and
a cover plate disposable over the base plate, the cover plate including a number of apertures arranged in a pattern corresponding to a pattern of the die placement regions, each aperture to sized to slidably receive one of the heat spreaders;
wherein each of the assemblies is removed from the base plate after a bonding process is performed.

20. The apparatus of claim 19, wherein the number of die placement regions on the base plate and the number of apertures in the cover plate each comprise between 4 and 24.

21. The apparatus of claim 19, wherein the cover plate further comprises a number of biasing elements, each of the biasing elements disposed proximate one of the apertures, each biasing element to compress a heat spreader against a die.

* * * * *